(12) United States Patent
McKinney

(10) Patent No.: US 6,595,569 B1
(45) Date of Patent: Jul. 22, 2003

(54) AUTOMATIC GATE ASSEMBLY

(75) Inventor: Bobby McKinney, Ft. Payne, AL (US)

(73) Assignee: The Heil Company, Chattanooga, TN (US)

( * ) Notice: Subject to any disclaimer, the term of this patent is extended or adjusted under 35 U.S.C. 154(b) by 13 days.

(21) Appl. No.: 10/082,722

(22) Filed: Feb. 26, 2002

(51) Int. Cl.⁷ ........................ B62D 33/027; E05D 15/16
(52) U.S. Cl. .............................. 296/51; 296/50; 296/56; 414/406; 160/201; 160/205; 160/207
(58) Field of Search .............................. 296/50, 51–61; 414/406, 519; 160/201, 205, 207

(56) References Cited

U.S. PATENT DOCUMENTS

| | | | | |
|---|---|---|---|---|
| 3,869,168 A | * | 3/1975 | Matheson | 296/56 |
| 3,873,149 A | * | 3/1975 | Churchman | 296/56 |
| 4,067,466 A | * | 1/1978 | Parks et al. | 296/51 |
| 4,691,956 A | * | 9/1987 | Hodge | 296/51 |
| 4,723,817 A | * | 2/1988 | Wallan | 296/51 |
| 4,951,999 A | * | 8/1990 | Rudolph et al. | 296/56 |
| 4,989,918 A | * | 2/1991 | Biddy | 298/23 |
| 4,993,908 A | * | 2/1991 | Park | 414/472 |
| 5,456,520 A | * | 10/1995 | Adams et al. | 296/51 |
| 5,527,098 A | * | 6/1996 | McKinney et al. | 298/23 |
| 5,890,770 A | * | 4/1999 | Palmberg, Jr. | 298/23 |
| 6,176,673 B1 | * | 1/2001 | Moyna et al. | 414/517 |
| 6,217,123 B1 | * | 4/2001 | Palmberg, Jr. | 298/23 |
| 6,264,262 B1 | * | 7/2001 | Clonch et al. | 296/51 |

OTHER PUBLICATIONS

U.S. patent application Ser. No. 02/174,197, Ryan, filed Nov. 18, 1938.
U.S. patent application Ser. No. 02/239,029, Barrett, filed Apr. 22, 1941.
U.S. patent application Ser. No. 02/831,727, Wilkinson, filed Apr. 22, 1958.
U.S. patent application Ser. No. 03/966,096, Worthington, filed Jun. 29, 1976.
U.S. patent application Ser. No. 04/067,464, Parks et al., filed Jan. 10, 1978.
U.S. patent application Ser. No. 04/165,897, Schmidt, filed Aug. 28, 1979.
U.S. patent application Ser. No. 04/666,211, Smith et al., filed May 19, 1987.
U.S. patent application Ser. No. 05/141,280, Gerrard, filed Aug. 25, 1992.
U.S. patent application Ser. No. 05/527,098, McKinney et al., filed Jun. 18, 1996.

* cited by examiner

Primary Examiner—D. Glenn Dayoan
Assistant Examiner—Greg Blankenship
(74) Attorney, Agent, or Firm—Chambliss, Bahner & Stophel, P.C.

(57) ABSTRACT

A gate assembly for closing an open end of a storage compartment that is defined by a pair of side walls includes an upper member that is mounted on the side walls of the storage compartment so as to be movable between an open position and a closed position. The gate assembly also includes a lower member having a top side and a bottom side. The top side is pivotally attached to the upper member along a generally horizontal axis. The gate assembly also includes a cam that is attached to one of the side walls of the storage compartment and a follower that is adapted to interact with the cam. The cam and follower are mounted and arranged with respect to a side wall of the storage compartment and the lower member so that as the upper member is moved from the open position to the closed position, interaction between the cam and follower will cause the lower member to pivot about the generally horizontal axis so that its bottom side moves toward the open end of the storage compartment.

16 Claims, 6 Drawing Sheets

AUTOMATIC GATE ASSEMBLY

FIELD OF THE INVENTION

This invention relates generally to a gate assembly for use on an item of refuse collection equipment. More particularly, the invention relates to a gate assembly for a refuse collection vehicle.

BACKGROUND AND DESCRIPTION OF THE PRIOR ART

Items of refuse collection equipment, including refuse collection vehicles, commonly utilize a gate assembly adapted to move between an open position that permits refuse to be removed from the refuse collection equipment and a closed position that retains the refuse in the collection equipment. Conventional gate assemblies, however, suffer from several disadvantages. Some such assemblies require an operator to manually guide the gate assembly as it moves between the open position and the closed position. Some assemblies also require the operator to manually secure the gate in the closed position. In addition, some conventional gate assemblies are complicated and expensive to manufacture, install, maintain and repair. Such gate assemblies are particularly susceptible to damage and extended periods of inoperability.

It would be desirable, therefore, if a gate assembly could be provided that would eliminate the need for an operator to manually guide the gate assembly as it is moved between the open position and the closed position. It would also be desirable if such an assembly could be provided that would eliminate the need for an operator to manually secure the assembly in the closed position. It would also be desirable if such an assembly could be provided that is simpler and less expensive to manufacture, install, maintain and repair and more reliable in operation than conventional assemblies.

ADVANTAGES OF THE INVENTION

Among the advantages of the invention is that it eliminates the need for an operator to manually guide the gate assembly as it is moved between the open position and the closed position. Another advantage of a preferred embodiment of the invention is that it eliminates the need for an operator to manually secure the assembly in the closed position. Still another advantage of the invention is that it provides a gate assembly that is simple and inexpensive to manufacture, install, maintain and repair and is reliable in its operation.

Additional advantages of this invention will become apparent from an examination of the drawings and the ensuing description.
Explanation of Technical Terms As used herein, the term "cam" refers to any structure adapted to interact with another structure with which it makes contact (hereinafter referred to as a "follower") in order to impart motion to the follower or to another structure in contact with or attached to the follower. The term "cam" may refer to a structure that makes sliding contact with a follower as well as a structure that makes rotational or other similar contact with a follower.

As used herein, the term "follower" refers to any structure adapted to interact with and make contact with a cam, as that term is defined above. The term "follower" may refer to (but is not limited to reference to) a bar, a pipe, a rod, a tube, a channel, a shaft or another elongated structural member.

SUMMARY OF THE INVENTION

The invention comprises a gate assembly for closing an open end of a storage compartment which is defined by a pair of side walls. The gate assembly includes an upper member that is mounted on the side walls of the storage compartment so as to be movable between an open position and a closed position. The gate assembly also includes a lower member having a top side and a bottom side. The top side is pivotally attached to the upper member along a generally horizontal axis. The gate assembly also includes a cam, and a follower that is adapted to interact with the cam. The cam and follower are mounted and arranged with respect to a side wall of the storage compartment and the lower member so that as the upper member is moved from the open position to the closed position, interaction between the cam and the follower causes the lower member to pivot about the generally horizontal axis so that the bottom side of the lower member moves toward the open end of the storage compartment.

In order to facilitate an understanding of the invention, the preferred embodiments of the invention are illustrated in the drawings, and a detailed description thereof follows. It is not intended, however, that the invention be limited to the particular embodiments described or to use in connection with the apparatus illustrated herein. Various modifications and alternative embodiments such as would ordinarily occur to one skilled in the art to which the invention relates are also contemplated and included within the scope of the invention described and claimed herein.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Figure 1:
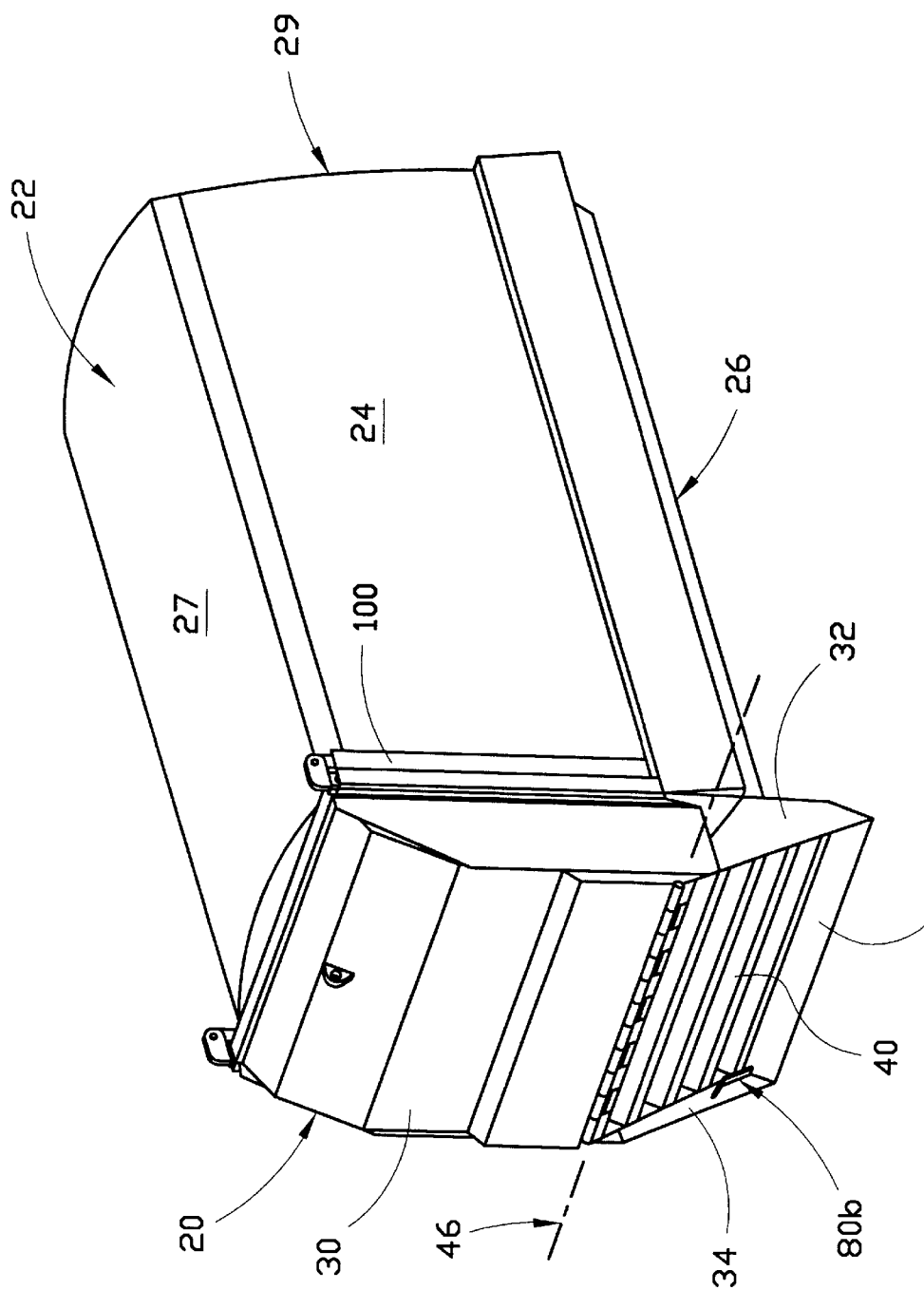
FIG. 1 is a perspective view of a preferred embodiment of the invention, as mounted on a storage compartment.

Referring now to the drawings, a preferred embodiment of the invention is illustrated in FIGS. 1 through 6. As illustrated in FIG. 1, the preferred embodiment of gate assembly 20 is adapted for use on storage compartment 22 which is defined by a pair of side walls. Gate assembly 20 may be mounted on a storage compartment that is mounted on the rear end of a refuse collection vehicle (not shown), or on a storage compartment that is mounted on the side or front of a refuse collection vehicle (also not shown), or on a storage compartment that is not mounted on a vehicle, such as a stationary refuse bin or container. As shown in the drawings, preferred storage compartment 22 is comprised of first side wall 24, a second side wall (not shown) located opposite the first side wall, floor 26, and roof 27. Gate assembly 20 is adapted to close open end 28 (See also FIGS. 3–6) of the storage compartment. Closed end 29 of storage compartment 22 is located opposite open end 28.

As shown in FIGS. 1 and 3–6, the preferred embodiment of gate assembly 20 comprises upper member 30 and lower member 40. Preferred upper member 30 is mounted on the side walls of the storage compartment so as to be movable between an open position which exposes open end 28 of storage compartment 22 (see FIG. 3) and a closed position which substantially closes open end 28 (see FIG. 6). Upper member 30 may be configured in any suitable configuration adapted to close the open end of the storage compartment (in cooperation with the lower member) and move between the open position and the closed position.

Upper member 30 is preferably provided with conventional rollers or shoes (not shown in the drawings) which are adapted to roll or slide within channels (also not shown) in the side walls of the storage compartment. As illustrated in FIGS. 3–6, preferred upper member 30 is adapted to move generally vertically with respect to open end 28 of storage compartment 22 between the open position and the closed position. While the preferred upper member is adapted to move generally vertically with respect to the storage compartment, it is also contemplated within the scope of the invention that the gate assembly may be adapted to move in any direction having a vertical component with respect to the open end of the storage compartment. Thus, for example, the upper member may move in a curved path or in an angled path, so long as such path has a vertical component.

The gate assembly also includes lower member 40 having a top side and a bottom side. As shown in the drawings (especially FIG. 2), preferred lower member 40 includes first side 42, second side 43, top side 44, and bottom side 45. Top side 44 is pivotally attached to upper member 30 along generally horizontal axis 46. It is preferred that lower member 40 be adapted to swing freely about generally horizontal axis 46 when the gate assembly (or the upper member) is in the open position.

Gate assembly 20 also includes a cam, and a follower that is adapted to interact with the cam. As described in more detail hereinafter, the cam and the follower are mounted and arranged with respect to a side wall of the storage compartment and the lower member so that as the upper member is moved from the open position to the closed position, interaction between the cam and the follower causes lower member 40 to pivot about generally horizontal axis 46 so that bottom side 45 moves toward open end 28 of the storage compartment. It is preferred that the cam be mounted on a side wall of the storage compartment and the follower be mounted on the lower member in such a way as to extend toward the closed end of the storage compartment, although other arrangements of the cam, follower and lower member are included within the scope of the invention. Most preferably, the cam will be mounted on a side wall of the storage compartment and the follower will be mounted on the lower member in such a way as to extend into the storage compartment.

As illustrated in FIGS. 3–6, preferred first cam 60 is mounted on the interior of first side wall 24 (which is partially cut away to show the preferred location for the cam). It is also preferred that a second cam (not shown) be mounted on the interior of the second side wall (not shown) opposite the first cam. The preferred cams have a circular cross-section but may be of any convenient shape. It is also contemplated within the scope of the invention that a single cam may be provided. One embodiment of a single cam may comprise a round bar extending from one side of the storage compartment to the other. Cam 60 is preferably fixed against rotation, but may also be mounted so as to rotate about its longitudinal axis (extending perpendicular to the page of FIGS. 3–6).

Figure 2:
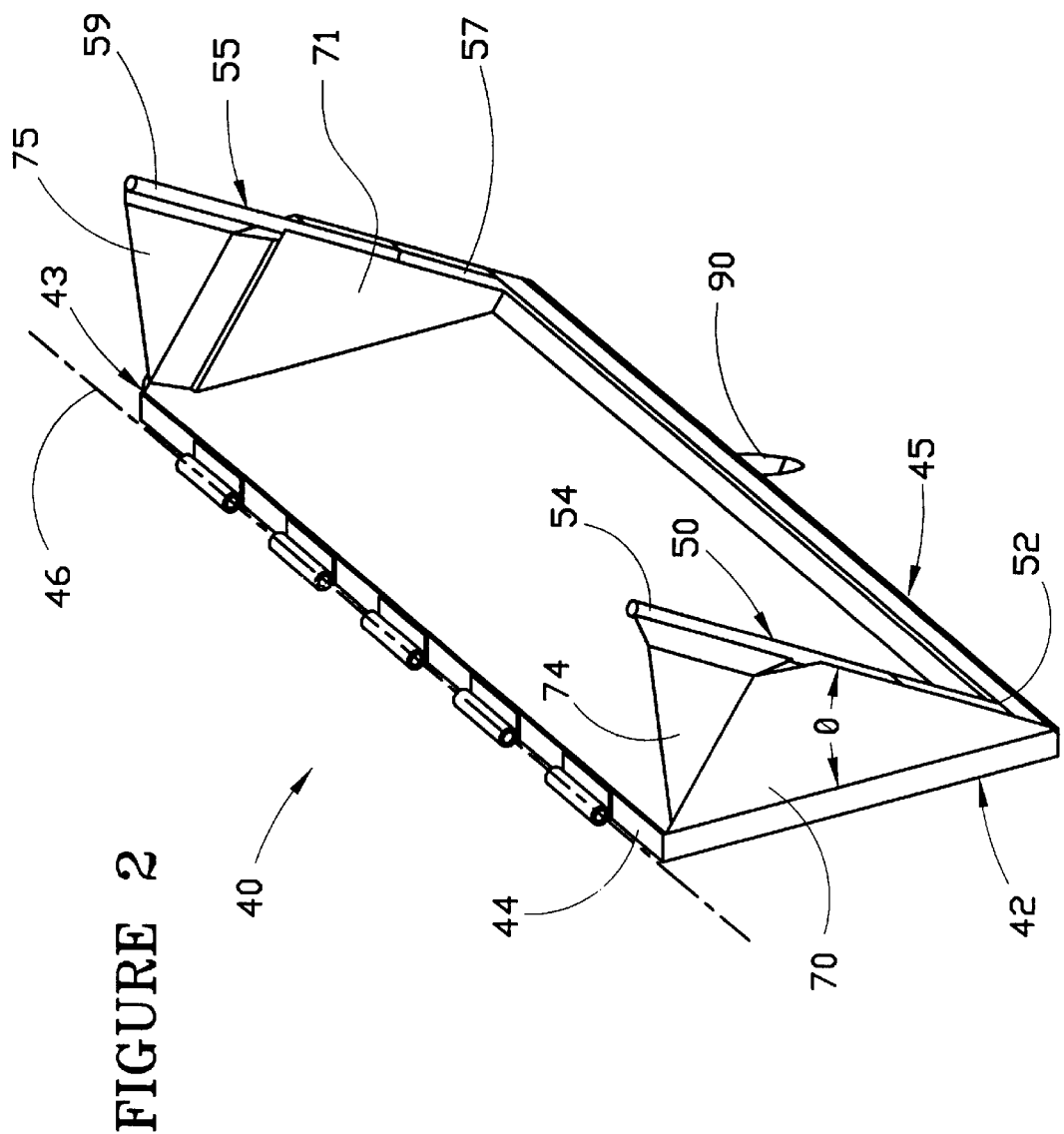
FIG. 2 is a perspective view of the lower member of the embodiment of the gate assembly illustrated in FIG. 1.

As illustrated in FIG. 2, preferred gate assembly 20 includes a pair of followers 50 and 55, each of which has a first end (52 and 57, respectively) that is attached to lower member 40 and a second end (54 and 59, respectively) opposite the first end. The first ends of preferred followers 50 and 55 are attached to first side 42 and second side 43, respectively, of lower member 40 near bottom side 45. The preferred followers extend from the bottom side of the lower member toward the top side at an acute angle θ (See FIG. 2) of between about 15° and about 20°. Most preferably, the followers extend from the bottom side of the lower member toward the top side at an angle θ of about 17°. The preferred followers are sections of round steel rod, but any suitable material and cross-sectional shape may be used. The preferred lower member also includes a pair of side panels that provide additional strength and stability to the assembly. As shown in FIG. 2, side panel 70 joins follower 50 to first side 42, thus providing further stability to follower 50. In the same manner, side panel 71 joins follower 55 to second side 43. The preferred side panels are sheet metal sections, but side panels 70 and 71 may be any suitable devices adapted to strengthen the connection between the lower member and the followers and provide stability for the followers. Preferred lower member 40 also includes a pair of deflectors 74 and 75 which are adapted to deflect refuse into the storage compartment.

Figure 3:
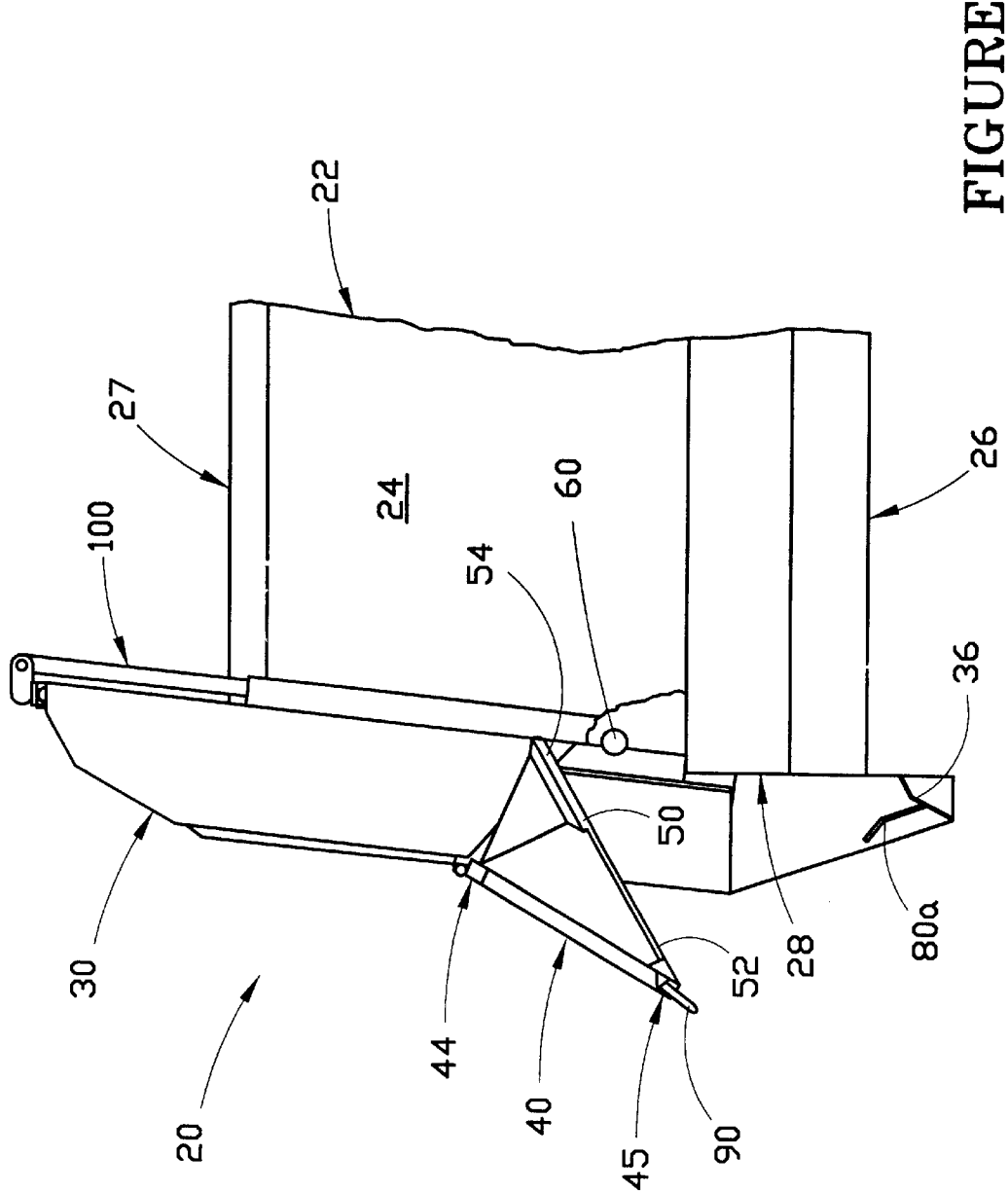
FIG. 3 is a side view of the embodiment of the gate assembly illustrated in FIG. 1, showing the gate assembly in the open position.
Figure 4:
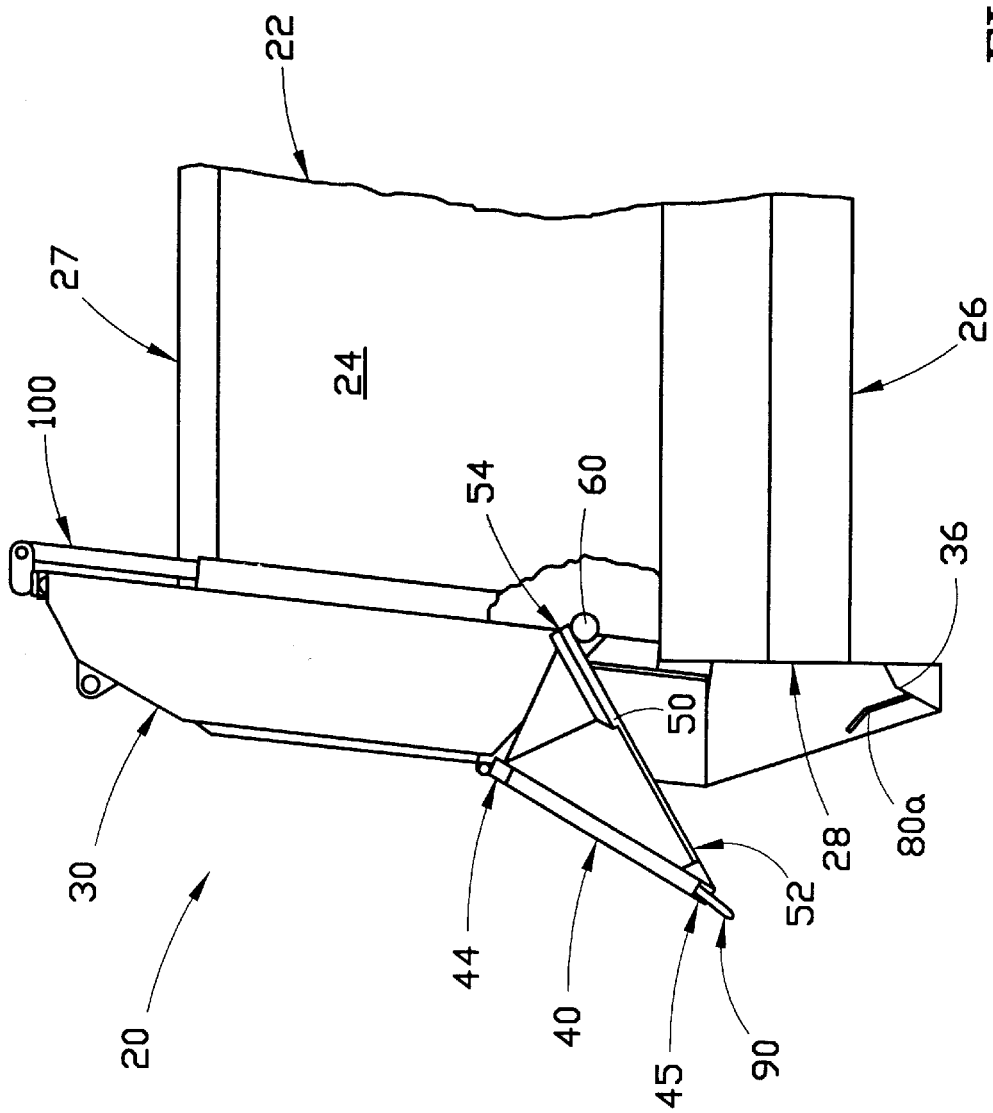
FIG. 4 is a side view of the embodiment of the gate assembly illustrated in FIGS. 1 and 3, showing the gate assembly in a first intermediate position between the open position and the closed position.
Figure 5:
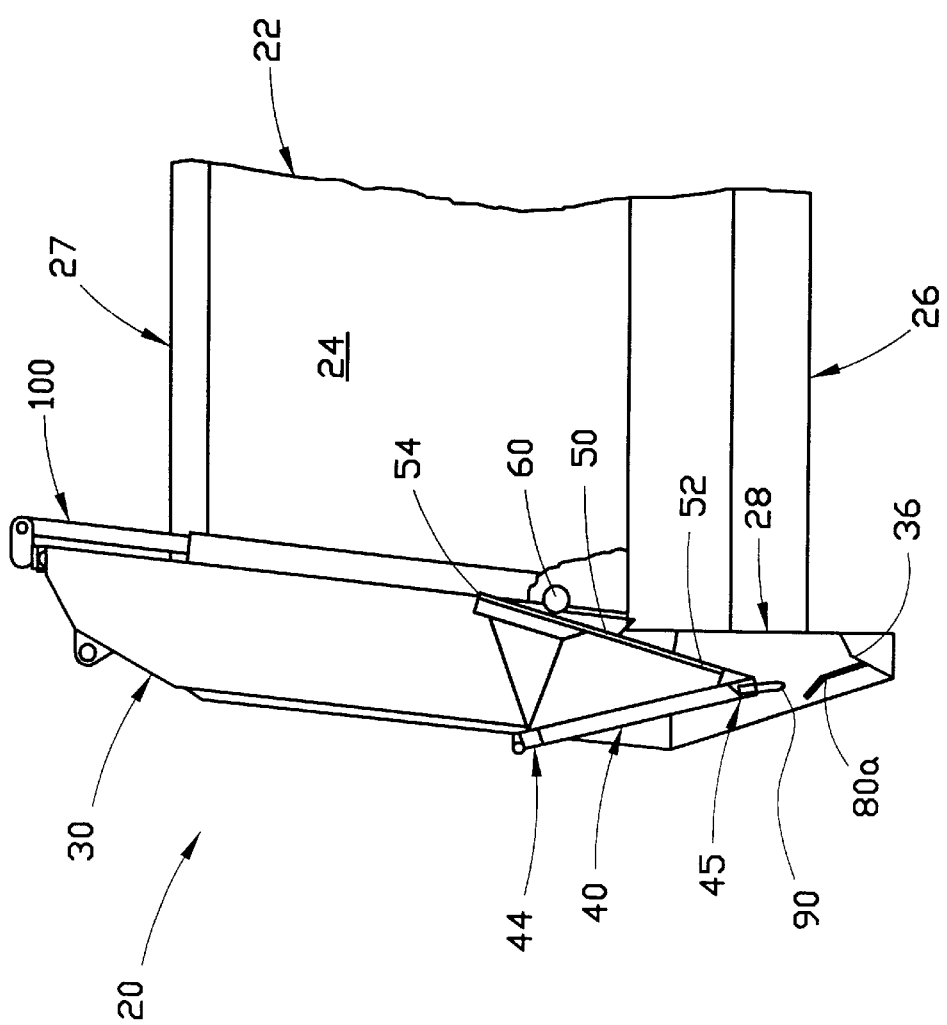
FIG. 5 is a side view of the embodiment of the gate assembly illustrated in FIGS. 1, 3 and 4, showing the gate assembly in a second intermediate position between the first intermediate position and the closed position.

Upper ends 54 and 59 of followers 50 and 55, respectively, are adapted to be in sliding contact with first cam 60 and a second cam (not shown), respectively, in order to move the lower member about the generally horizontal axis as shown in FIGS. 3–6. The cams and followers of the gate assembly are mounted and arranged with respect to the side walls of the storage compartment and lower member 40 so that as upper member 30 is moved from the open position to the closed position, interaction between the cam and the follower causes the lower member to pivot about generally horizontal axis 46 so that bottom side 45 moves toward open end 28 of the storage compartment. As preferred upper member 30 moves from the open position (FIG. 3) to the closed position (FIG. 6), it will pass through a series of intermediate positions, including a first intermediate position illustrated in FIG. 4 and a second intermediate position illustrated in FIG. 5. As upper member 30 moves from the open position toward the closed position, upper end 54 of preferred follower 50 will come into contact with cam 60 (FIG. 4) and follower 50 will slide against the cam and rotate the lower member inwardly toward the open end of the storage compartment (FIG. 5).

Figure 6:
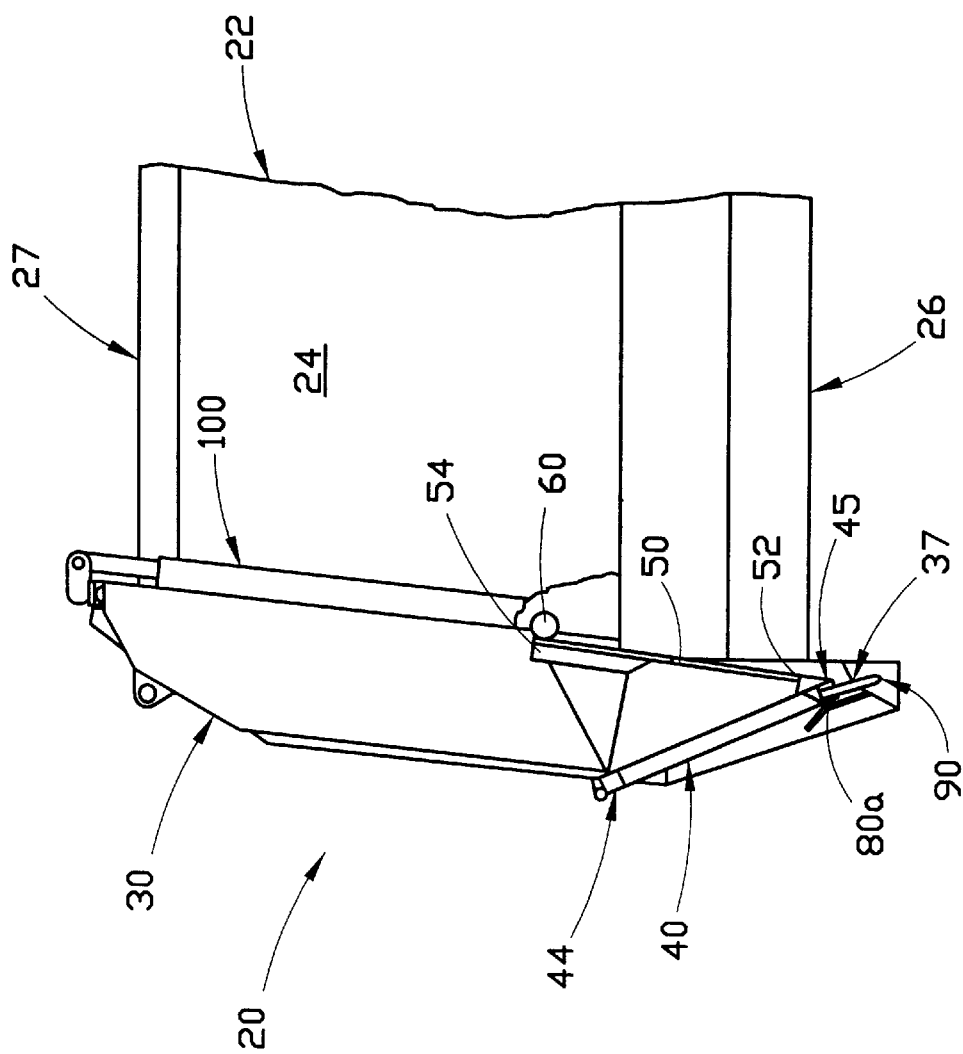
FIG. 6 is a side view of the embodiment of the gate assembly illustrated in FIGS. 1 and 3–5, showing the gate assembly in the closed position.

The preferred gate assembly also includes a pair of retainer arms 80a (see FIGS. 3–6) and 80b (FIG. 1) for guiding bottom side 45 of lower member 40 into a secure position when the gate assembly is in the closed position and for releasably securing the lower member to lower lip extension 36 of the storage compartment. As shown in FIG. 1, the retainer arms are mounted on side wall extensions 32 and 34 and lower lip extension 36. As shown in FIGS. 5 and 6, the retainer arms are shaped, arranged and located so as to assist in urging bottom side 45 of lower member 40 towards open end 28 of the storage compartment. Preferably, the retainer arms will also assist in retaining the lower member in place when the assembly is in the closed position. Retainer pin 90 is preferably provided on bottom side 45 of lower member 40 to mate with a pin hole 37 (see FIG. 6) in the lower lip extension near open end 28 of the storage compartment so as to releasably secure the lower member to the storage compartment when the gate assembly is in the closed position. The cooperation of retainer pin 90 and retainer pin hole 37 also assists in preventing outward bending (i.e. away from open end 28) of the lower member during loading caused by compacting the refuse in the storage compartment.

The preferred gate assembly of the invention also includes means for moving the gate assembly between the open position and the closed position. The preferred means for moving the gate assembly between the open position and the closed position is a pair of hydraulic cylinders 100 (only one of which is shown) located on either side of the storage compartment and attached to the upper member. It is contemplated within the scope of the invention, however, that the means for moving the gate assembly between the open position and the closed position may be single hydraulic actuator or any other suitable means such as a pulley and spring assembly.

In operation, the numerous advantages of the gate assembly of the invention are apparent. When the gate assembly is in the open position, as illustrated in FIG. 3, refuse may be removed from the storage compartment by means of a packer ram or ejection ram (not shown). In the open position, the upper member of the assembly is vertically raised with respect to the storage compartment and the lower member may swing freely about the horizontal axis. As illustrated in FIGS. 4 and 5, as hydraulic actuator 100 is actuated to move the upper member downwardly, the followers come into contact with the cams on the side walls of the storage compartment, and this interaction causes the bottom side of the lower member to move inwardly toward the open end of the storage compartment. As the upper member continues to move downwardly, the retainer arms guide the lower member into the closed position shown in FIG. 6 where it is further secured by the mating of pin 90 in pin hole 37. As should be apparent from this description and an examination of the drawings, the gate assembly may be moved between the open position (FIG. 3) and the closed position (FIG. 6) without any guiding of the lower member by an operator. Furthermore, the gate assembly may be secured in the closed position without any manual intervention by an operator. In the closed position, the gate assembly prevents refuse from falling out of the storage compartment, even if it is compacted against the lower member. The gate assembly may be moved from the closed position back to the open position by causing the hydraulic actuator to move the upper member upwardly with respect to the storage compartment.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations, and the same are intended to be comprehended within the meaning and range of equivalents of the appended claims.

What is claimed is:

1. A gate assembly for closing an open end of a storage compartment defined by a pair of side walls, said gate assembly comprising:
   (a) an upper member that is mounted on the side walls so as to be movable between an open position and a closed position;
   (b) a lower member having a top side that is pivotally attached to the upper member along a generally horizontal axis, and a bottom side;
   (c) a cam;
   (d) a follower that is adapted to interact with the cam;
   wherein one of said cam and follower is mounted on the lower member so as to extend toward the closed end of the storage compartment, and the other of said cam and follower is mounted on one of said pair of side walls of the storage compartment, said cam and follower being arranged so that as the upper member is moved from the open position to the closed position, interaction between the cam and the follower causes the lower member to pivot about the generally horizontal axis so that its bottom side moves toward the open end of the storage compartment.

2. The gate assembly of claim 1 wherein the lower member is adapted to swing freely about the generally horizontal axis when the assembly is in the open position.

3. The gate assembly of claim 1 which includes a retainer arm mounted on the storage compartment that is adapted to guide the bottom side of the lower member of the gate assembly into a closed position.

4. The gate assembly of claim 1 wherein the storage compartment is provided with a lower lip extension having a hole therein and wherein the lower member of the gate assembly includes a retainer pin that is adapted to mate with the hole to releasably secure the lower member to the storage compartment when the gate assembly is in the closed position.

5. The gate assembly of claim 1 which includes means for moving the upper member between the open position and the closed position.

6. The gate assembly of claim 5 wherein the means for moving the upper member between the open position and the closed position comprises a hydraulic actuator.

7. The gate assembly of claim 1 wherein the cam is mounted on one of said pair of side walls of the storage compartment and the follower is mounted on the lower member so that interaction between the cam and the follower as the upper member is moved from the open position to the closed position causes the lower member to pivot about the generally horizontal axis so that its bottom side moves toward the open end of the storage compartment.

8. The gate assembly of claim 7 wherein a side panel is provided to attach the follower to the lower member of the gate assembly.

9. The gate assembly of claim 1 which includes a pair of cams and a pair of followers, wherein:
   (a) a cam is mounted on each of said pair of side walls of the storage compartment;
   (b) the lower member has a first side and a second side; and
   (c) a follower is mounted to each of the first and second sides of the lower member so that interaction between the cams and the followers as the upper member is moved from the open position to the closed position causes the lower member to pivot about the generally horizontal axis so that its bottom side moves toward the open end of the storage compartment.

10. A gate assembly adapted for use on an item of refuse collection equipment having a storage compartment defined by a pair of side walls, an open end, and a closed end, said gate assembly being adapted to move between an open position and a closed position and further comprising:

(a) an upper member that is moveable in a direction having a vertical component with respect to the open end of the storage compartment;

(b) a lower member having a top side that is pivotally attached to said upper member along a generally horizontal axis, and a bottom side;

(c) a follower that is mounted on the lower member so as to extend from the bottom side thereof into the storage compartment at an acute angle with respect to one of the first or second sides of the lower member;

(d) a cam that is mounted to one of said pair of side walls of the storage compartment in such manner that the follower interacts with the cam when the gate assembly is moved from the open position to the closed position, such interaction causing the lower member to pivot about the generally horizontal axis so that its bottom side moves toward the open end of the storage compartment.

11. The gate assembly of claim 10 which includes a cam mounted on the other of said pair of side walls of the storage compartment and a pair of followers, one of which is mounted on the first side of the lower member and the other of which is mounted on the second side, so that interaction between the cams and the followers as the upper member is moved from the open position to the closed position causes the lower member to pivot about the generally horizontal axis so that its bottom side moves toward the open end of the storage compartment.

12. The gate assembly of claim 10 wherein the follower extends from the bottom side of the lower member toward the top side at an angle of between about 15° and about 20°.

13. The gate assembly of claim 10 wherein the follower extends from the bottom side of the lower member toward the top side at an angle of about 17°.

14. The gate assembly of claim 10 which includes a side panel that joins the follower to the first side of the lower member.

15. The gate assembly of claim 10 which includes means for moving the upper member between the open position and the closed position.

16. The gate assembly of claim 15 wherein the means for moving the upper member between the open position and the closed position comprises a hydraulic actuator.

* * * * *